(12) United States Patent
Fujimoto (10) Patent No.: US 7,778,012 B2
(45) Date of Patent: Aug. 17, 2010

(54) ELECTROLYTIC CAPACITOR

(75) Inventor: Kazumasa Fujimoto, Saga (JP)

(73) Assignees: Sanyo Electric Co., Ltd., Moriguchi-shi (JP); Saga Sanyo Industries Co., Ltd., Saga (JP)

( * ) Notice: Subject to any disclaimer, the term of this patent is extended or adjusted under 35 U.S.C. 154(b) by 353 days.

(21) Appl. No.: 11/943,239

(22) Filed: Nov. 20, 2007

(65) Prior Publication Data

US 2008/0117566 A1    May 22, 2008

(30) Foreign Application Priority Data

Nov. 22, 2006    (JP) .............................. 2006-315012

(51) Int. Cl.
*H01G 9/00* (2006.01)

(52) U.S. Cl. ...................... 361/523; 361/516; 361/519; 361/525; 361/528; 361/530

(58) Field of Classification Search ................. 361/530, 361/508–512, 516–519, 523–529, 540–541
See application file for complete search history.

(56) References Cited

U.S. PATENT DOCUMENTS

| | | | | |
|---|---|---|---|---|
| 6,052,273 | A * | 4/2000 | Inoue et al. | 361/523 |
| 6,208,503 | B1 * | 3/2001 | Shimada et al. | 361/523 |
| 6,307,735 | B1 * | 10/2001 | Saito et al. | 361/517 |
| 6,510,044 | B1 * | 1/2003 | Loffelholz et al. | 361/510 |
| 6,970,343 | B2 * | 11/2005 | Hayashi et al. | 361/504 |
| 7,256,983 | B2 * | 8/2007 | Ozawa et al. | 361/519 |
| 7,529,079 | B2 * | 5/2009 | Fujimoto et al. | 361/523 |

FOREIGN PATENT DOCUMENTS

| | | |
|---|---|---|
| JP | 2000-114117 A | 4/2000 |
| JP | 2003142345 A | 5/2003 |
| KR | 2006-0091247 A | 8/2006 |

OTHER PUBLICATIONS

Korean Office Action dated Dec. 8, 2008, issued in corresponding Korean Patent Application No. 10-2007-83708.

* cited by examiner

*Primary Examiner*—Nguyen T Ha
(74) *Attorney, Agent, or Firm*—Westerman, Hattori, Daniels & Adrian, LLP (57) ABSTRACT

An electrolytic capacitor comprises two lead tab terminals and a sealing rubber packing. Each of the lead tab terminals includes a boss member, a rib member and a flat member. The boss member comprises a coupling member and a large member. The diameter of the coupling member is the same as two holes in the sealing rubber packing, and the diameter of the large member is larger than the two holes. The flat member is connected to either an oxidized anode foil or a cathode foil. The coupling members of the two lead-tab terminals are inserted into the two holes in the sealing rubber packing, respectively. The large member keeps the sealing rubber packing from moving toward the flat member. Accordingly, the sealing member sealing the capacitor element into a case is kept from making contact with the capacitor element.

6 Claims, 7 Drawing Sheets

ELECTROLYTIC CAPACITOR

BACKGROUND OF THE INVENTION

1. Field of the Invention

The present invention relates to winding type electrolytic capacitors.

2. Description of the Related Art

Following the recent demand for electrical circuits that are smaller in size and adapted for high-frequency, capacitors with lower impedance have been required. In particular, absorption of high-frequency noise and ripple current is required in designing driving circuits for CPUs (Central Processing Units) of computers, switching power circuits and the like, and therefore, capacitors whose ESR (Equivalent Series Resistance) can be made lower have become necessary.

Winding type electrolytic capacitors have been attracting attention as their ESR can be made lower. Japanese Unexamined Patent Application Publication No. 2003-142345 discloses a well-known electrolytic capacitor with high capacitance. This electrolytic capacitor is fabricated in such a manner that an anode foil, a cathode foil and a separator sheet placed therebetween are rolled up together.

BRIEF SUMMARY OF THE INVENTION

There is a problem, however, with conventional electrolytic capacitors: In order to allow an electrolytic capacitor larger capacitance and lower ESR while maintaining the size of the electrolytic capacitor, its capacitor element which is to be placed in an aluminum case needs to be bigger. While the height of the capacitor element becomes higher, however, the distance between the capacitor element and the sealing rubber packing becomes smaller and the sealing rubber packing comes into contact with the capacitor element.

Accordingly, the present invention is intended to solve the aforementioned problem, and an object of the invention is to provide an electrolytic capacitor whose sealing member sealing the capacitor element into a case is kept from contact with the capacitor element.

According to an aspect of the present invention, an electrolytic capacitor comprises a capacitor element, first and second lead tab terminals. The capacitor element is fabricated in such a manner that an anode member and a cathode member are rolled up together with a separator sheet placed therebetween. The first lead tab terminal is connected to the anode member. The second lead tab terminal is connected to the cathode member. Each of the first and the second lead tab terminals comprises a supporting member that enables the capacitor element to keep the distance from a sealing member sealing it into a case to a distance equal to or more than a prescribed distance.

According to another aspect of the present invention, an electrolytic capacitor comprises a capacitor element and first and second lead tab terminals. The capacitor element is fabricated in such a manner that an anode member and a cathode member are rolled up together with a separator sheet placed therebetween. The first lead tab terminal is connected to the anode member. The second lead tab terminal is connected to the cathode member. Each of the first and the second lead tab terminals includes a connecting member, a coupling member and a large member. The connecting member is connected to either the anode member or the cathode member. The coupling member is inserted into a sealing member sealing the capacitor element into a case. The large member is formed between the connecting member and the coupling member. The diameter of the large member is larger than the hole in the sealing member into which the coupling member is inserted.

Preferably, the diameter of the large member is almost constant in the length direction of the lead tab terminal.

Preferably, heading from the end along the connecting member, the large member is gradually tapered toward the coupling member.

Preferably, an electrolytic capacitor further comprises electrolyte. The electrolyte consists of any one of polythiophene-group, polypyrrole-group, or polyaniline-group conductive polymer, or TCNQ (7,7,8,8-tetracyano-quinodimethane) complex salt.

With the electrolytic capacitor in accordance with the present invention, each of the lead tab terminals comprises the supporting member that enables the capacitor element to keep the distance from the sealing member to a distance equal to or more than a prescribed distance. Accordingly, the sealing member is placed in a manner that it keeps a prescribed distance from the capacitor element.

Therefore, in accordance with the present invention, the sealing member is kept from making contact with the capacitor element.

Further, with the electrolytic capacitor in accordance with the present invention, the large member of the lead tab terminal has a diameter which is larger than the diameter of the hole in the sealing member into which the coupling member is inserted. Therefore, it is impossible for the sealing member to move toward the capacitor element over the large member.

Therefore, in accordance with the present invention, the sealing member is kept from making contact with the capacitor element.

Additional objects and advantages of the present invention will be apparent from the following detailed description, which are best understood with reference to the accompanying drawings.

DETAILED DESCRIPTION OF THE INVENTION

Embodiments of the present invention will be described in detail with reference to the figures. In the figures, identical or corresponding components are denoted by the same reference characters and description thereof will not be repeated.

Embodiment 1

Figure 1:
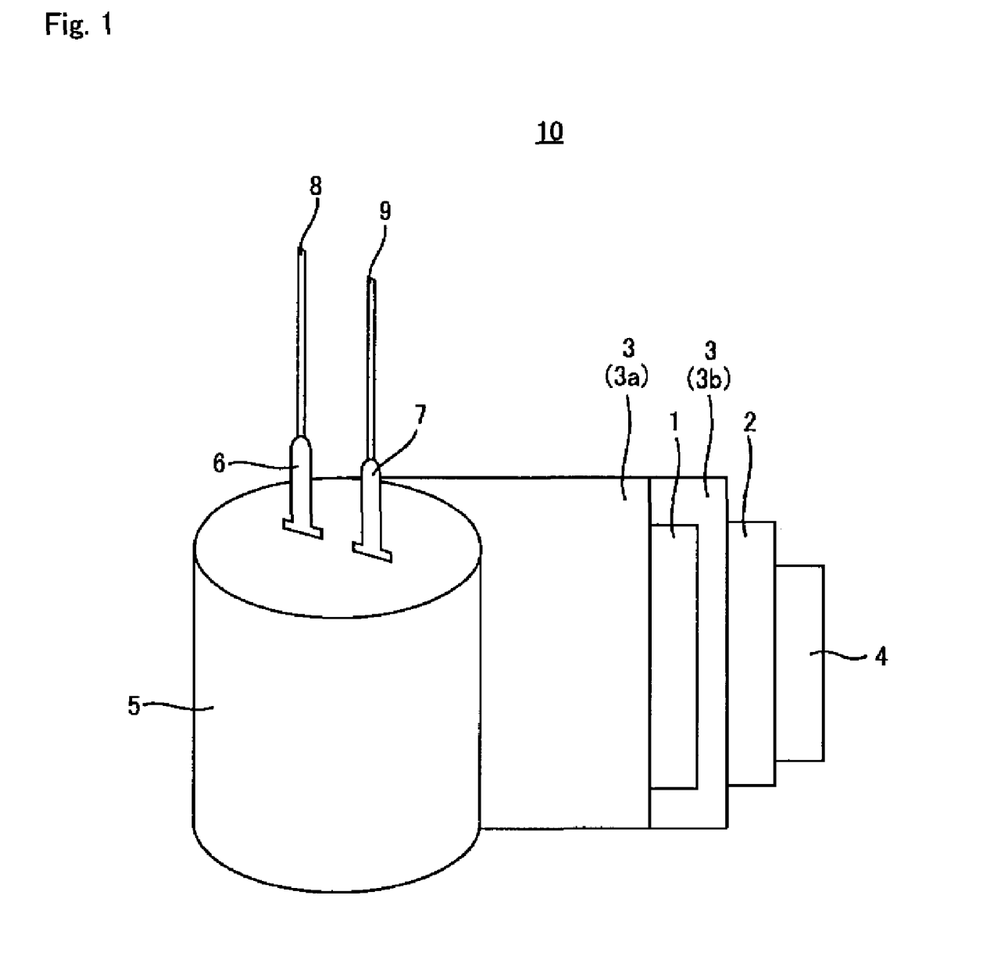
FIG. 1 is a perspective view showing a structure of an electrolytic capacitor in accordance with Embodiment 1 of the present invention.
Figure 2:
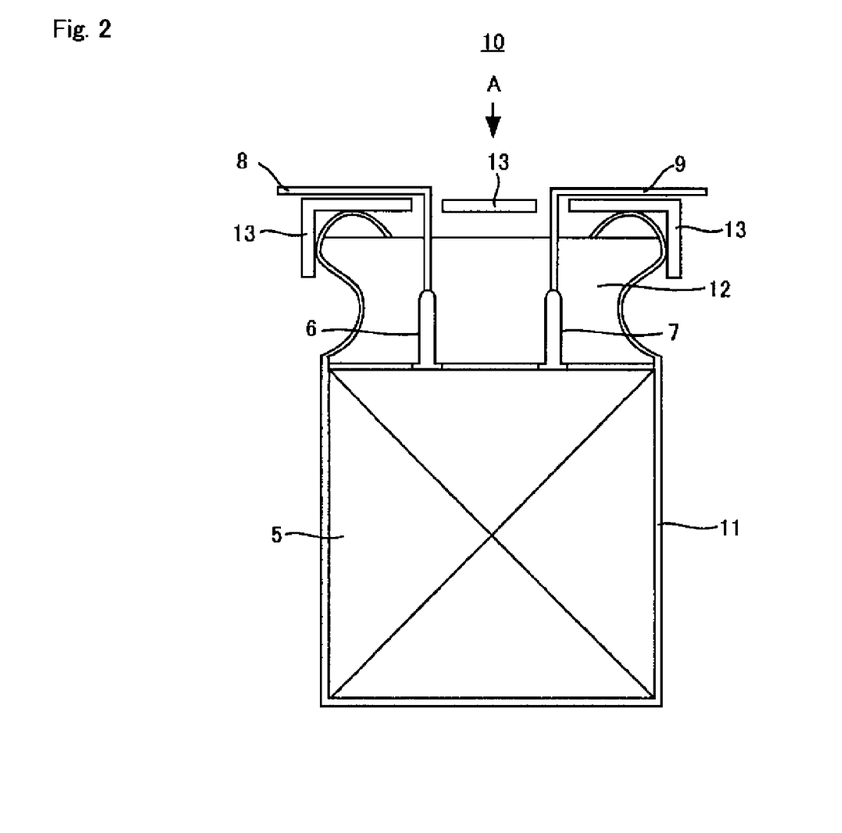
FIG. 2 is a cross-sectional view of the electrolytic capacitor in accordance with Embodiment 1 of the present invention.

FIG. 1 is a perspective view showing a structure of an electrolytic capacitor in accordance with Embodiment 1 of the present invention. FIG. 2 is a cross-sectional view showing another structure of the electrolytic capacitor in accordance with Embodiment 1 of the present invention. With reference to FIGS. 1 and 2, the electrolytic capacitor 10 in accordance with Embodiment 1 of the present invention comprises an oxidized anode foil 1, a cathode foil 2, separator sheets 3, a securing tape 4, lead tab terminals 6 and 7, an anode lead 8, a cathode lead 9, a case 11, a sealing rubber packing 12, and a seat plate 13.

The electrolytic capacitor 10 is, by way of example, an electrolytic capacitor including solid electrolyte.

The oxidized anode foil 1 is formed of aluminum foil the surface of which has been processed by chemical conversion treatment. Therefore, the surface of the oxidized anode foil 1 becomes rough and the rough surface is coated with an oxide layer. The cathode film 2 is formed of aluminum foil.

The oxidized anode foil 1 and the cathode foil 2 are placed together with the separator sheets 3 placed therebetween, and then rolled up. After rolled up, the rolled stack of the oxidized anode foil 1, the cathode foil 2 and the separator sheets 3 is sealed up with a securing tape 4. In this manner, the capacitor element 5 which is almost cylindrical is formed.

The lead tab terminal 6 is connected to the oxidized anode foil 1, and the lead tab terminal 7 is connected to the cathode foil 2. The anode lead 8 is connected to the lead tab terminal 6, and the cathode lead 9 is connected to the lead tab terminal 7.

The case 11 is formed of aluminum and houses the capacitor element 5, the lead tab terminals 6 and 7, the anode lead 8, and the cathode lead 9. The sealing rubber packing 12 seals up the capacitor element 5 and the lead tab terminals 6 and 7 into the case 11. The seat plate 13 fixes the anode lead 8 and the cathode lead 9. The anode lead 8 and the cathode lead 9 are bent along the seat plate 13 when the capacitor element 5 is placed in the case 11.

Figure 3:
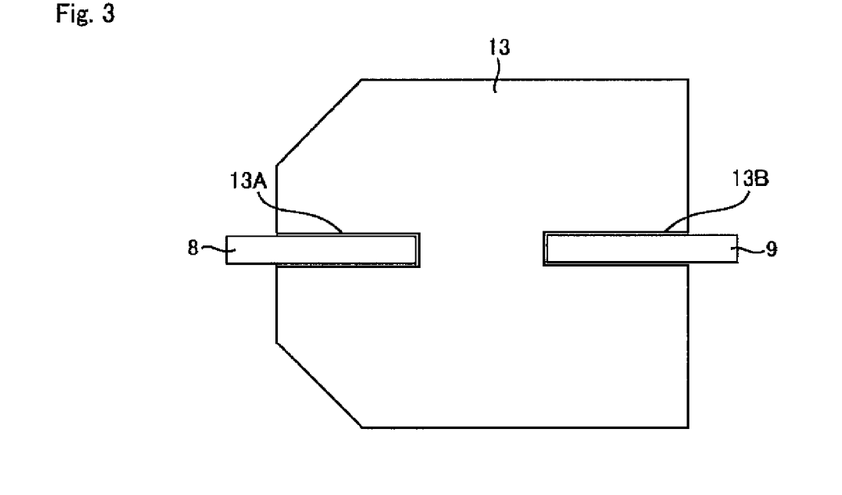
FIG. 3 is a plan view of the electrolytic capacitor viewed from the direction A in FIG. 2.

FIG. 3 is a plan view of the electrolytic capacitor 10 viewed from the direction A in FIG. 2. With reference to FIG. 3, the seat plate 13 is almost a rectangle and has cutouts 13A and 13B. The anode lead 8 and the cathode lead 9 are bent to the inner side of the seat plate 13 to be fit into the cutouts 13A and 13B of the seat place 13, respectively.

The bent anode lead 8 and cathode lead 9 are used as terminals of the electrolytic capacitor 10.

Figure 4:
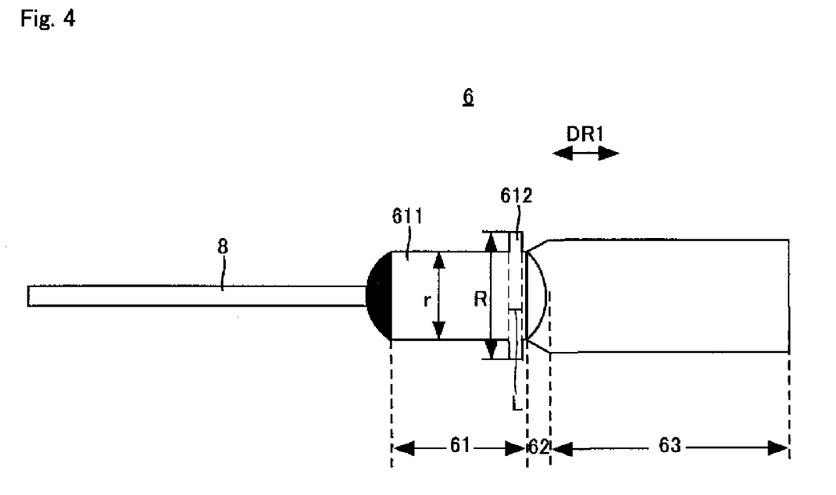
FIG. 4 is a plan view of the lead tab terminal shown in FIG. 1.

FIG. 4 is a plan view of the lead tab terminal 6 shown in FIG. 1. With reference to FIG. 4, the lead tab terminal 6 includes a boss member 61, a rib member 62 and a flat member 63. The boss member 61 is connected to the rib member 62, and the rib member 62 is connected to the flat member 63.

The boss member 61 comprises a coupling member 611 and a large member 612. The coupling member 611 has, for example, a diameter r of 1.0 mm or 1.2 mm. The large member 612 has a diameter R which is larger than the diameter r of the coupling member 611 by 0.4 mm to 0.6 mm. Therefore, the large member 612 is protruding out 0.2 mm to 0.3 mm from both sides of the coupling member 611. The large member 612 has a length L which is equal to or longer than 0.2 mm in the length direction DR1 of the lead tab terminal 6.

The coupling member 611 is connected to the anode lead 8 and the large member 612 is connected to the rib member 62.

Accordingly, the large member 612 is positioned between the coupling member 611 and the flat member 63.

The lead tab terminal 7 shown in FIG. 1 has the same planar structure as the lead tab terminal 6 shown in FIG. 4.

Figure 5:
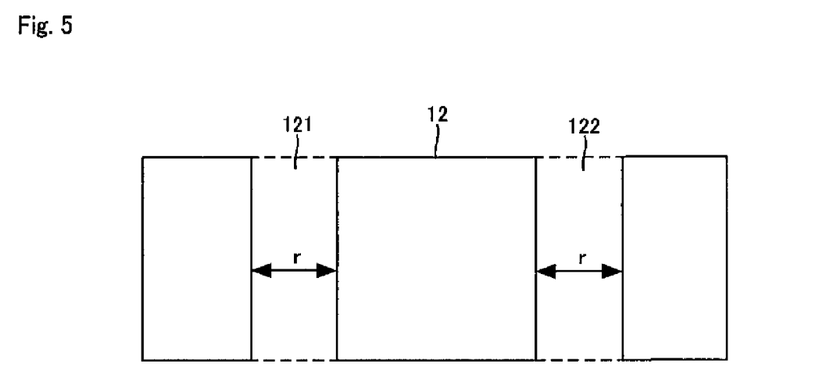
FIG. 5 is a cross-sectional view of the sealing rubber packing shown in FIG. 2.

FIG. 5 is a cross-sectional view of the sealing rubber packing 12 shown in FIG. 2. With reference to FIG. 5, the sealing rubber packing 12 has holes 121 and 122. The holes 121 and 122 are for insertion of the coupling member 611 of the boss member 61 of the lead tab terminals 6 and 7. The diameter of the holes 121 and 122 is the same as the diameter r of the coupling member 611.

Figure 6:
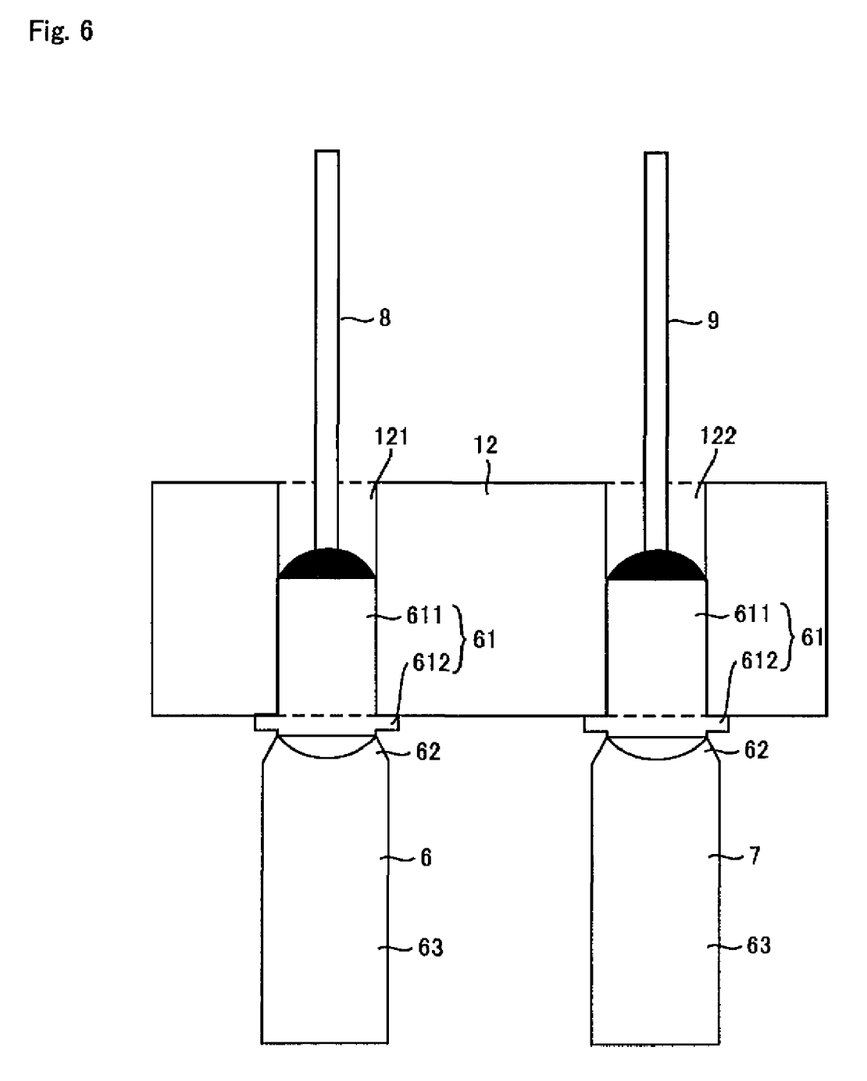
FIG. 6 is a cross-sectional view illustrating the lead tab terminals inserted into the sealing rubber packing.

FIG. 6 is a cross-sectional view illustrating the lead tab terminals 6 and 7 inserted into the sealing rubber packing 12. With reference to FIG. 6, the anode lead 8 is connected to the lead tab terminal 6, and the lead tab terminal 6 to which the anode lead 8 is connected is inserted into the hole 121 in the sealing rubber packing 12. Since the lead tab terminal 6 has the coupling member 611, which diameter is the same in size as the diameter r of the hole 121, and the large member 612, which diameter R is larger than the diameter r of the hole 121, only the coupling member 611 of the lead tab terminal 6 is inserted into the hole 121 in the sealing rubber packing 12.

The cathode lead 9 is connected to the lead tab terminal 7, and the lead tab terminal 7 to which the cathode lead 9 is connected is inserted into the hole 122 in the sealing rubber packing 12. Since the lead tab terminal 7 has the coupling member 611, which diameter is the same in size as the diameter r of the hole 122, and the large member 612, which diameter R is larger than the diameter r of the hole 122, only the coupling member 611 of the lead tab terminal 7 is inserted into the hole 122 in the sealing rubber packing 12.

Accordingly, the sealing rubber packing 12 is held at the position of the large member 612, and the sealing rubber packing 12 never moves toward the flat member 63 (where the capacitor element 5 is placed) over the large member 12. Therefore, by forming the large member 612, it is possible to keep the distance between the sealing rubber packing 12 and the capacitor element 5 (which is placed at the flat member 63 of the lead tab terminals 6 and 7) to a distance equal to or more than a prescribed distance. That is to say, the sealing rubber packing 12 is kept from making contact with the capacitor element 5.

Figure 7:
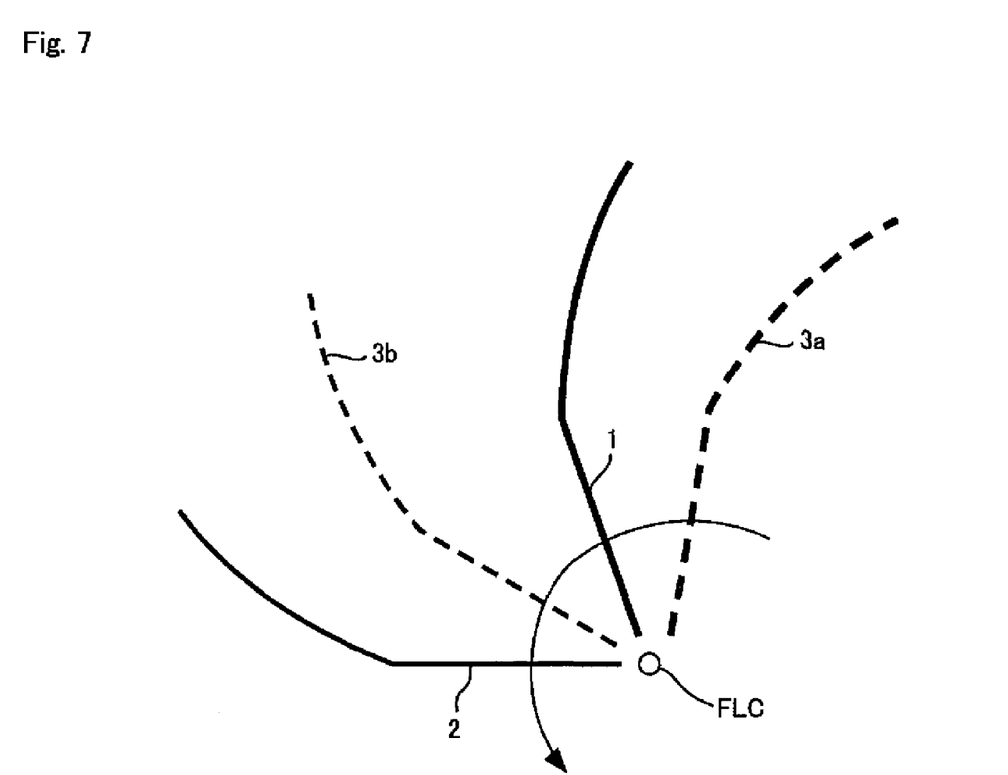
FIG. 7 illustrates how the oxidized anode foil, the cathode foil and the separator sheets are rolled up.

FIG. 7 illustrates how the oxidized anode foil 1, the cathode foil 2 and the separator sheets 3 are rolled up. How to fabricate the electrolytic capacitor 10 shown in FIGS. 1 and 2 will be explained hereafter. In fabricating the electrolytic capacitor 10, the surface of aluminum foil is etched, processed by chemical conversion treatment and cut into a certain size (of length L and width W) to form a sheet of the oxidized anode foil 1. A sheet of the cathode foil 2 is formed by cutting aluminum foil into a certain size (of length L and width W).

The oxidized anode foil 1, the cathode foil 2 and the two separator sheets 3a and 3b are placed together as shown in FIG. 7. Then, the oxidized anode foil 1, the cathode foil 2, and the separator sheets 3a and 3b are wound counterclockwise (or clockwise), pivoting around a pivot point FLC, to be rolled up. The end of the rolled stack of the oxidized anode foil 1, the cathode foil 2, and the separator sheets 3a and 3b is sealed up with the securing tape 4. In this manner, the capacitor element 5 is formed.

After that, the capacitor element 5 is processed by chemical conversion treatment and, then, impregnated with mixed solution of 3,4-ethylenedioxythiophene which forms conductive polymer by polymerization and ferric p-toluenesulfonic acid alcohol solution. By impregnated with this mixed solution, a conductive polymer layer as electrolyte is formed.

Then, the sealing rubber packing 12 is inserted into the capacitor element 5 in a manner that the lead tab terminals 6 and 7 are inserted into the holes 121 and 122, respectively. Since each of the lead tab terminals 6 and 7 has the large member 612, the sealing rubber packing 12 is inserted into the capacitor element 5 so as to make contact with the large member 612.

Then, the capacitor element 5 into which the sealing rubber packing 12 is inserted is housed in the case 11. The open member of the case 11 is pressed and curled to seal in the capacitor element 5.

Then, the capacitor element 5 is aged. The seat plate 13 which is made of plastic is inserted onto the curled open end of the case 11. The anode lead 8 and the cathode lead 9 are pressed as electrode terminals and bent along the seat plate 13 to form electrodes. In this manner, the electrolytic capacitor 10 is formed.

As described above, since the electrolytic capacitor 10 is formed in such a manner that the sealing rubber packing 12 is inserted to the position of the large member 612 which diameter R is larger than the diameter r of the holes 121 and 122 in the sealing rubber packing 12, and the large member 612 is provided between the sealing rubber packing 12 and the capacitor element 5, the sealing rubber packing 12 is kept from making contact with the capacitor element 5.

Embodiment 2

Figure 8:
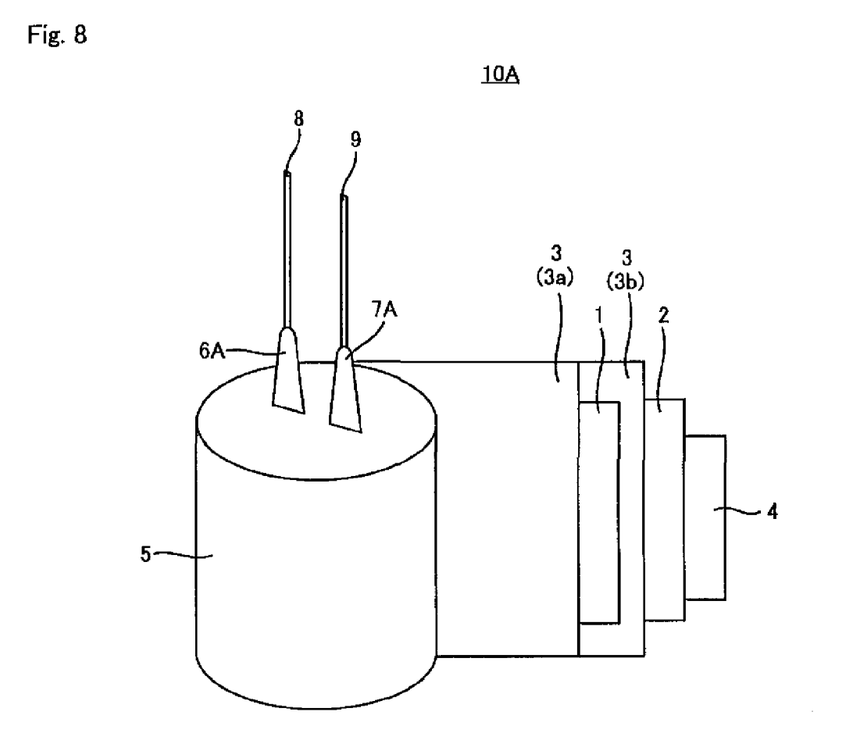
FIG. 8 is a perspective view showing a structure of an electrolytic capacitor in accordance with Embodiment 2 of the present invention.

FIG. 8 is a perspective view showing a structure of an electrolytic capacitor in accordance with Embodiment 2 of the present invention. With reference to FIG. 8, the electrolytic capacitor 10A in accordance with Embodiment 2 is the same as the electrolytic capacitor 10 except that the lead tab terminals 6 and 7 of the electrolytic capacitor 10 shown in FIG. 1 are replaced with lead tab terminals 6A and 7A, respectively.

The lead tab terminal 6A is connected to the oxidized anode foil 1 of the capacitor element 5 and the anode lead 8. The lead tab terminal 7A is connected to the cathode foil 2 of the capacitor element 5 and the cathode lead 9.

Figure 9:
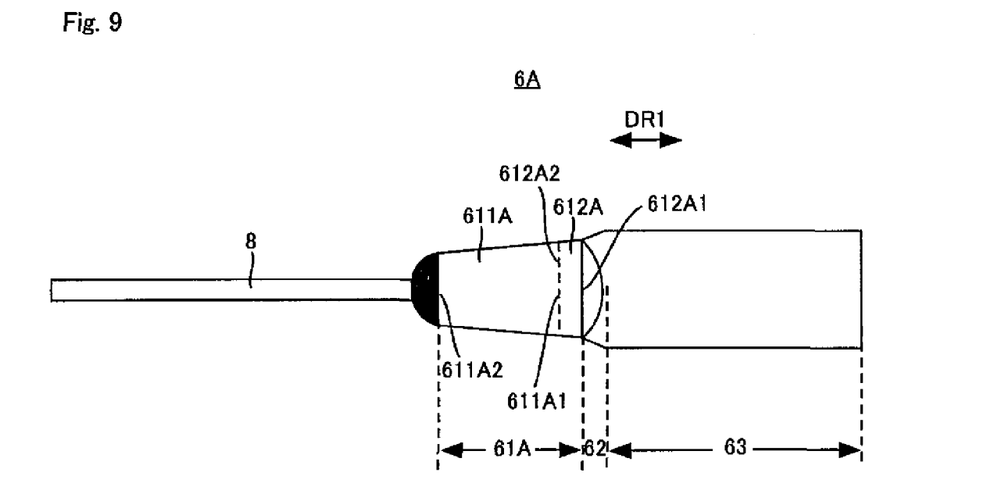
FIG. 9 is a plan view of the lead tab terminal shown in FIG. 8.

FIG. 9 is a plan view of the lead tab terminal 6A shown in FIG. 8. With reference to FIG. 9, the lead tab terminal 6A is the same as the lead tab terminal 6 except that the boss member 61 of the lead tab terminal 6 shown in FIG. 4 is replaced with a boss member 61A.

One end of the boss member 61A is connected to the rib member 62, and the other end is connected to the anode lead 8. The boss member 61A comprises a coupling member 611A and a large member 612A. One end 6116A1 of the coupling member 611A is connected to the large member 612A, and the large member 612A is connected to the coupling member 611A and the rib member 62. Accordingly, the large member 612A is positioned between the coupling member 611A and the flat member 63.

The coupling member 611A has a diameter r, which gradually reduces toward the other end 611A2, at the one end 611A1. The diameter of the large member 612A gradually reduces from one end 612A1 to the other end 612A2, and the large member 612A has a diameter r at the other end 612A2. The large member 612A has a thickness L in the length direction DR1 of the lead tab terminal 6A. As described above, the diameter of the large member 612A gradually reduces toward the coupling member 611A.

Accordingly, the diameter of the boss member 61A gradually reduces in the length direction DR1 of the lead tab terminal 6A.

The lead tab terminal 7A shown in FIG. 8 has the same planar structure as the lead tab terminal 6A shown in FIG. 9.

Figure 10:
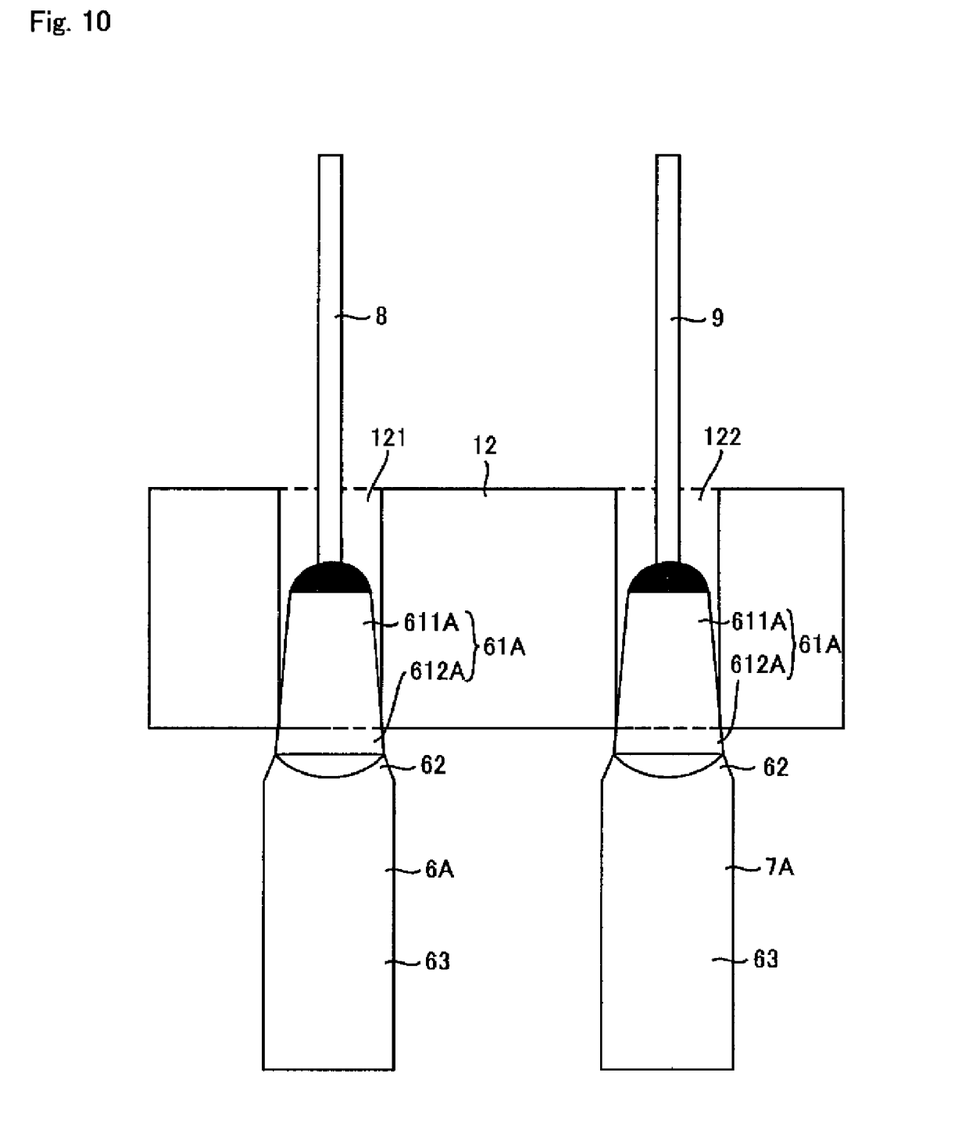
FIG. 10 is a cross-sectional view of the lead tab terminals shown in FIG. 8 as inserted into the sealing rubber packing.

FIG. 10 is a cross-sectional view of the lead tab terminals 6A and 7A shown in FIG. 8 as inserted into the sealing rubber packing 12. With reference to FIG. 10, the anode lead 8 is connected to the lead tab terminal 6A, and the lead tab terminal 6A to which the anode lead 8 is connected is inserted into the hole 121 in the sealing rubber packing 12. Since the lead tab terminal 6A has the coupling member 611A, which diameter is equal to or smaller than the diameter r of the hole 121, and the large member 612A, which diameter is larger than the diameter r of the hole 121, only the coupling member 611A of the lead tab terminal 6A is inserted into the hole 121 in the sealing rubber packing 12.

The cathode lead 9 is connected to the lead tab terminal 7A, and the lead tab terminal 7A to which the cathode lead 9 is connected is inserted into the hole 122 in the sealing rubber packing 12. Since the lead tab terminal 7A has the coupling member 611A, which diameter is equal to or smaller than the diameter r of the hole 122, and the large member 612A, which diameter is larger than the diameter r of the hole 122, only the coupling member 611A of the lead tab terminal 7A is inserted into the hole 122 in the sealing rubber packing 12.

Accordingly, the sealing rubber packing 12 is held at the position of the large member 612A and never moves toward the flat member 63 (where the capacitor element 5 is placed) over the large member 612A. Therefore, by forming the large member 612A, it is possible to keep the distance between the sealing rubber packing 12 and the capacitor element 5 (which is placed at the flat member 63 of the lead tab terminals 6A and 7A) to a distance equal to or more than a prescribed distance. That is to say, the sealing rubber packing 12 is kept from making contact with the capacitor element 5.

The electrolytic capacitor 10A shown in FIG. 8 is fabricated in the same manner as the electrolytic capacitor 10 shown in FIG. 1.

According to Embodiment 2, since the electrolytic capacitor 10A is fabricated in such a manner that the sealing rubber packing 12 is inserted to the position of the large member 612A which diameter is larger than the diameter r of the holes 121 and 122 in the sealing rubber packing 12, and the large member 612A is provided between the sealing rubber packing 12 and the capacitor element 5, the sealing rubber packing 12 is kept from making contact with the capacitor element 5.

Other aspects are the same as Embodiment 1.

Table 1 shows the number of claimed electrolytic capacitors the capacitor element 5 of which came into contact with the sealing rubber packing 12.

TABLE 1

|  | The number of capacitors whose capacitor element came into contact with the sealing rubber packing. (unit) | |
| --- | --- | --- |
|  | 4 V-560 µF | 4 V-330 µF |
| Present Invention | 0/500 | 0/500 |
| Conventional Capacitors | 7/500 | 10/500 |

Table 1 also shows, for the sake of comparison, the number of conventional electrolytic capacitors whose capacitor element came into contact with the sealing rubber packing.

In conducting the above experiment, electrolytic capacitors of 4V-560 µF and 4V-330 µF are fabricated. The electrolytic capacitor of 4V-560 µF has a diameter of 8 mm and a length of 9 mm. The electrolytic capacitor of 4V-330 µF has a diameter of 6.3 mm and a length of 6 mm.

According to the result shown in Table 1, it is understood that with the electrolytic capacitors in accordance with the present invention, the sealing rubber packing 12 is completely kept from making contact with the capacitor element 5.

Therefore, in fabricating an electrolytic capacitor, using the lead tab terminals 6 and 7, or 6A and 7A, which have the above-described large members 612 or 612A makes it possible for the sealing rubber packing 12 to be completely kept from making contact with the capacitor element 5.

Although the conductive polymer as electrolyte is described above as consisting of poly(3,4-ethylenedioxythiophene), the conductive polymer as electrolyte in the present invention may consist of any one of polythiophene-group, polypyrrole-group or polyaniline-group conductive polymer. The electrolyte may includes TCNQ (7,7,8,8-tetracyano-quinodimethane) complex salt.

In the present invention, the flat member 63 forms the connecting member. The lead tab terminals 6 and 6A form the first lead tab terminals, respectively, and the lead tab terminals 7 and 7A form the second lead tab terminals, respectively.

The large member 612 and 612A form the supporting member, respectively, as they keep the distance between the sealing rubber packing 12 and the capacitor element 5 to a distance equal to or more than a prescribed distance.

The sealing rubber packing 12 forms the sealing member.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An electrolytic capacitor comprising:
    a capacitor element formed by rolling up an anode member, a cathode member and a separator sheet placed therebetween;
    a first lead tab terminal connected to the anode member; and
    a second lead tab terminal connected to the cathode member;
    wherein each of the first and the second lead tab terminals includes
    a connecting member connected to the anode member or the cathode member,
    a coupling member inserted into a sealing member sealing the capacitor element into a case, and
    a large member positioned between the connecting member and the coupling member, the large member having a diameter larger than holes in the sealing member into which the coupling member is inserted.

2. The electrolytic capacitor according to claim 1, wherein the diameter of the large member is almost constant in the length direction of the lead tab terminal.

3. The electrolytic capacitor according to claim 2, further comprising electrolyte including any one of polythiophene-group, polypyrrole-group, or polyaniline-group conductive polymer, or TCNQ (7,7,8,8-tetracyano-quinodimethane) complex salt.

4. The electrolytic capacitor according to claim 1, wherein heading from the end along the connecting member, the large member is gradually tapered toward the coupling member.

5. The electrolytic capacitor according to claim 4, further comprising electrolyte including any one of polythiophene-group, polypyrrole-group, or polyaniline-group conductive polymer, or TCNQ (7,7,8,8-tetracyano-quinodimethane) complex salt.

6. The electrolytic capacitor according to claim 1, further comprising electrolyte including any one of polythiophene-group, polypyrrole-group, or polyaniline-group conductive polymer, or TCNQ (7,7,8,8-tetracyano-quinodimethane) complex salt.

* * * * *